(12) United States Patent
Ishida et al.

(10) Patent No.: US 11,014,542 B2
(45) Date of Patent: May 25, 2021

(54) BRAKING CONTROL DEVICE FOR VEHICLE

(71) Applicant: ADVICS CO., LTD., Kariya (JP)

(72) Inventors: Yasuhito Ishida, Toyokawa (JP); Takayuki Yamamoto, Nagakute (JP)

(73) Assignee: ADVICS CO., LTD., Kariya (JP)

( * ) Notice: Subject to any disclaimer, the term of this patent is extended or adjusted under 35 U.S.C. 154(b) by 197 days.

(21) Appl. No.: 16/320,861

(22) PCT Filed: Jul. 26, 2017

(86) PCT No.: PCT/JP2017/027111
§ 371 (c)(1),
(2) Date: Jan. 25, 2019

(87) PCT Pub. No.: WO2018/021438
PCT Pub. Date: Feb. 1, 2018

(65) Prior Publication Data
US 2020/0164842 A1    May 28, 2020

(30) Foreign Application Priority Data
Jul. 27, 2016  (JP) .............................. JP2016-147009

(51) Int. Cl.
*B60T 8/172*   (2006.01)
*B60T 7/04*    (2006.01)
*B60T 17/22*   (2006.01)

(52) U.S. Cl.
CPC .............. *B60T 8/172* (2013.01); *B60T 7/042* (2013.01); *B60T 17/221* (2013.01);
(Continued)

(58) Field of Classification Search
CPC combination set(s) only.
See application file for complete search history.

(56) References Cited

U.S. PATENT DOCUMENTS

| 6,410,993 B1 | 6/2002 | Giers |
| 2012/0109482 A1* | 5/2012 | Yoshii ...................... B60T 7/12 |
| | | 701/70 |

(Continued)

FOREIGN PATENT DOCUMENTS

| JP | 2001522331 A | 11/2001 |
| JP | 2010167970 A | 8/2010 |
| JP | 2014097687 A | 5/2014 |

OTHER PUBLICATIONS

U.S. Appl. No. 16/318,816, filed Jan. 18, 2019, Ishida et al.
(Continued)

*Primary Examiner* — Marthe Y Marc-Coleman
(74) *Attorney, Agent, or Firm* — Buchanan Ingersoll & Rooney PC

(57) ABSTRACT

A braking control device comprises: an operational displacement sensor detecting operational displacement of a braking member; a first hydraulic pressure unit that reads operational displacement as a first displacement processing value via a first displacement signal line and adjusts braking hydraulic pressure based on the first displacement processing value; a second hydraulic pressure unit that reads operational displacement as a second displacement processing value via a second displacement signal line and adjusts braking hydraulic pressure based on the second displacement processing value; and a communication bus transmitting signals between the first and second hydraulic pressure units. The first hydraulic pressure unit acquires the second displacement processing value via the communication bus and determines suitability/unsuitability of the first displacement processing value. When the first displacement processing value is suitable (unsuitable), the first hydraulic pressure unit adjusts the braking hydraulic pressure on the basis of the first (second) displacement processing value.

4 Claims, 5 Drawing Sheets

(52) U.S. Cl.
CPC ... *B60T 2270/402* (2013.01); *B60T 2270/413* (2013.01); *B60T 2270/82* (2013.01)

(56) References Cited

U.S. PATENT DOCUMENTS

| | | | | |
|---|---|---|---|---|
| 2013/0073133 | A1* | 3/2013 | Muta | F02D 29/02 |
| | | | | 701/22 |
| 2016/0082937 | A1* | 3/2016 | Nakaoka | B60T 7/042 |
| | | | | 303/15 |
| 2016/0311413 | A1* | 10/2016 | Odate | B60T 8/72 |
| 2017/0021895 | A1* | 1/2017 | Yasukawa | B60T 8/1706 |

OTHER PUBLICATIONS

International Search Report (PCT/ISA/210) dated Oct. 31, 2017, by the Japanese Patent Office as the International Searching Authority for International Application No. PCT/JP2017/027111.

Written Opinion (PCT/ISA/237) dated Oct. 31, 2017, by the Japanese Patent Office as the International Searching Authority for International Application No. PCT/JP2017/027111.

* cited by examiner

BRAKING CONTROL DEVICE FOR VEHICLE

TECHNICAL FIELD

The present invention relates to a braking control device for a vehicle.

BACKGROUND ART

Patent Literature 1 describes, in an aim of "appropriately determining abnormality in an output of a stroke sensor by comparing two output values of the stroke sensor" that "a first abnormality determination unit 90 determines that the output of a first stroke sensor 46a or a second stroke sensor 46b is abnormal if a sum of a first output value and second output value is outside a predetermined range. A second abnormality determination unit 92 determines that the output of the first stroke sensor 46a or the second stroke sensor 46b is abnormal if a sum of the first output value and the second output value is determined as within the predetermined range by the first abnormality determination unit 90, an absolute value of a difference between the first output value and the second output value is smaller than or equal to a predetermined threshold value and a master output value is smaller than a predetermined pressure value".

Patent Literature 2 describes, in an aim of "suppressing supply of hydraulic pressure to a wheel cylinder with both a hydraulic pressure control mechanism and a booster mechanism", that "a first ECU 26 controls an electric actuator 20 of an electric booster device 16. A second ECU 33 controls the operation of an ESC 31 which is a hydraulic pressure control device. The second ECU 33 operates the ESC 31 to perform a backup control of supplying a brake fluid to wheel cylinders 3L, 3R, 4L, 4R when determining the malfunction of the first ECU 26. On the other hand, the first ECU 26 does not control the electric actuator 20 when the second ECU 33 performs the backup control".

In order to improve the reliability of the control device, Patent Literature 1 describes including a plurality of sensors (first and second stroke sensors). In addition, Patent Literature 2 describes that two hydraulic pressure control devices are provided, where when one of the devices malfunctions, backup is performed by the other device. In the configuration with the plurality of control devices described in Patent Literature 2, a large number of sensors are required to improve the reliability. For this reason, it is desired to have a simple configuration and ensure the reliability of the entire device.

CITATIONS LIST

Patent Literature

Patent Literature 1: Japanese Laid-Open Patent Application Publication No. 2010-167970
Patent Literature 2: Japanese Laid-Open Patent Application Publication No. 2014-097687

SUMMARY OF INVENTION

Technical Problems

It is an object of the present invention to provide a braking control device for a vehicle configured by a plurality of control devices, in which the configuration is simple and the reliability can be ensured.

Solutions to Problems

A brake control device for a vehicle according to the present invention adjusts a braking hydraulic pressure (Pwc) of a wheel cylinder (WC) according to an operation of a braking operation member (BP) of the vehicle to produce a brake force at a wheel (WH). The braking control device for the vehicle includes an operational displacement sensor (SBP) that detects an operational displacement (Sbp) of the braking operation member (BP); a first hydraulic pressure unit (EAA) that reads the operational displacement (Sbp) as a first displacement processing value (Sba) via a first displacement signal line (LMA) and adjusts the braking hydraulic pressure (Pwc) based on the first displacement processing value (Sba); a second hydraulic pressure unit (EAB) that reads the operational displacement (Sbp) as a second displacement processing value (Sbb) via a second displacement signal line (LMB) and adjusts the braking hydraulic pressure (Pwc) based on the second displacement processing value (Sbb); and a communication bus (CMB) for transmitting a signal between the first hydraulic pressure unit (EAA) and the second hydraulic pressure unit (EAB).

In the braking control device for the vehicle according to the present invention, the first hydraulic pressure unit (EAA) acquires the second displacement processing value (Sbb) from the second hydraulic pressure unit (EAB) via the communication bus (CMB), executes a suitability determination (S150) of "whether or not the first displacement processing value (Sba) is suitable", adjusts the braking hydraulic pressure (Pwc) based on the first displacement processing value (Sba) when the first displacement processing value (Sba) is suitable, and adjusts the braking hydraulic pressure (Pwc) based on the second displacement processing value (Sbb) in place of the first displacement processing value (Sba) when the first displacement processing value (Sba) is unsuitable.

In the braking control device for the vehicle according to the present invention, the first hydraulic pressure unit (EAA) executes the suitability determination (S150) based on a disconnection determination of "whether or not the first displacement signal line (LMA) is disconnected".

The braking control device for the vehicle according to the present invention further includes an operation force sensor (FBP, PSM) that detects an operation force (Fbp, Psm) of the braking operation member (BP). The first hydraulic pressure unit (EAA) calculates a displacement conversion value (Sbh), which is a state variable related to displacement, based on the operation force (Fbp, Psm), and executes the suitability determination (S150) on the basis of a comparison between the first displacement processing value (Sba) and the displacement conversion value (Sbh).

In the braking control device for the vehicle according to the present invention, one of the first hydraulic pressure unit (EAA) and the second hydraulic pressure unit (EAB) transmits a synchronization signal (Cnt) at every calculation cycle when the first displacement processing value (Sba) is unsuitable. The first hydraulic pressure unit (EAA) acquires the second displacement processing value (Sbb) based on the synchronization signal (Cnt).

According to the above configuration, the braking hydraulic pressure Pwc is adjusted based on the first displacement processing value Sba by the first hydraulic pressure unit EAA when the first displacement processing value Sba is appropriate. When determined that the first displacement processing value Sba is unsuitable, the operation of the first hydraulic pressure unit EAA is not stopped. After the first displacement processing value Sba is determined unsuitable, the adoption of the first displacement processing value Sba is stopped and the braking hydraulic pressure Pwc is adjusted by the first hydraulic pressure unit EAA based on the second displacement processing value Sbb obtained via the communication bus CMB. Therefore, a redundant system is formed with a simple configuration, and the reliability of the operation of the device can be secured. Furthermore, sensor signals are mutually monitored by one operational displacement sensor SBP, and the reliability of the device can be secured.

DESCRIPTION OF EMBODIMENTS

First Embodiment of Braking Control Device for Vehicle According to the Present Invention A first embodiment of a braking control device for a vehicle will be described with reference to the overall configuration diagram of FIG. 1 and the function block diagram of FIG. 2. In the following description, constituent members denoted by the same symbols, calculation process, signals, characteristics, and values are of the same function. Therefore, redundant explanation may be omitted.

Figure 1:
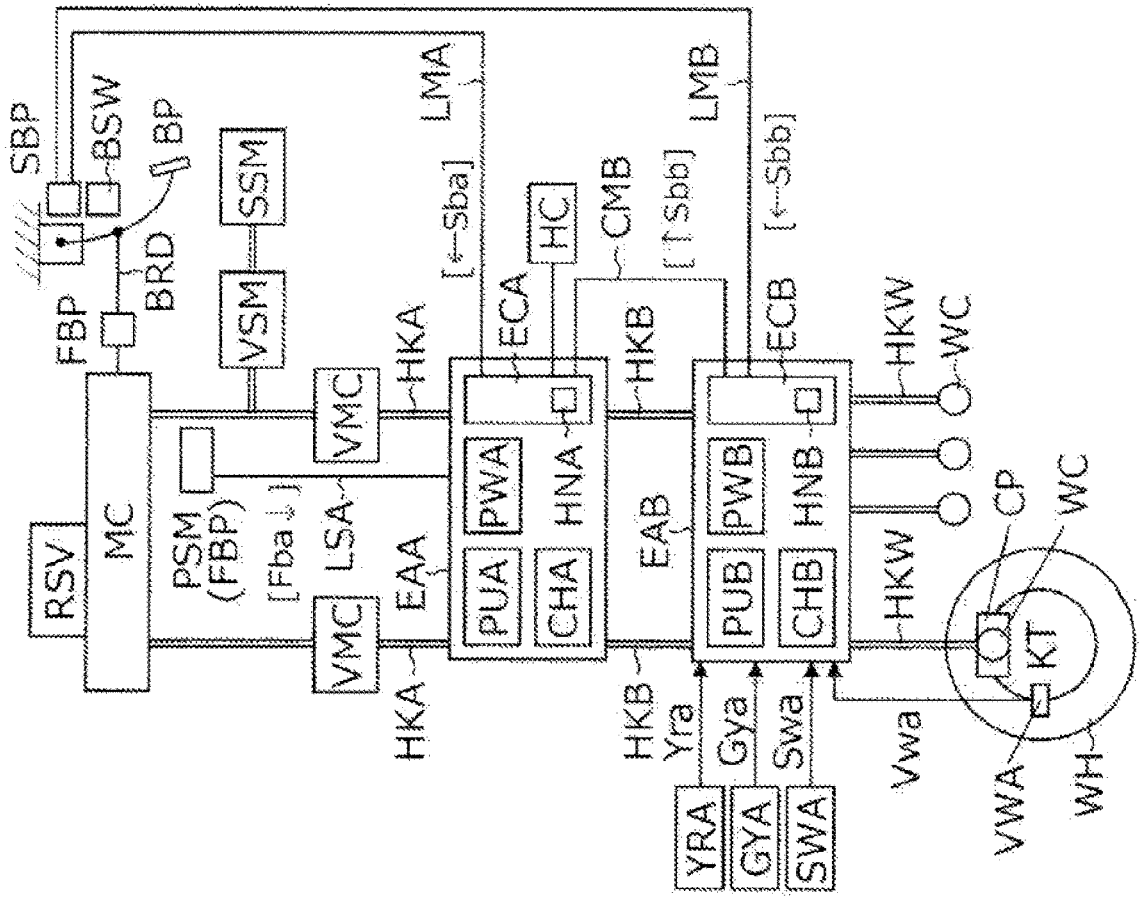
FIG. 1 is an overall configuration diagram for explaining a first embodiment of a braking control device for a vehicle according to the present invention.
Figure 2:
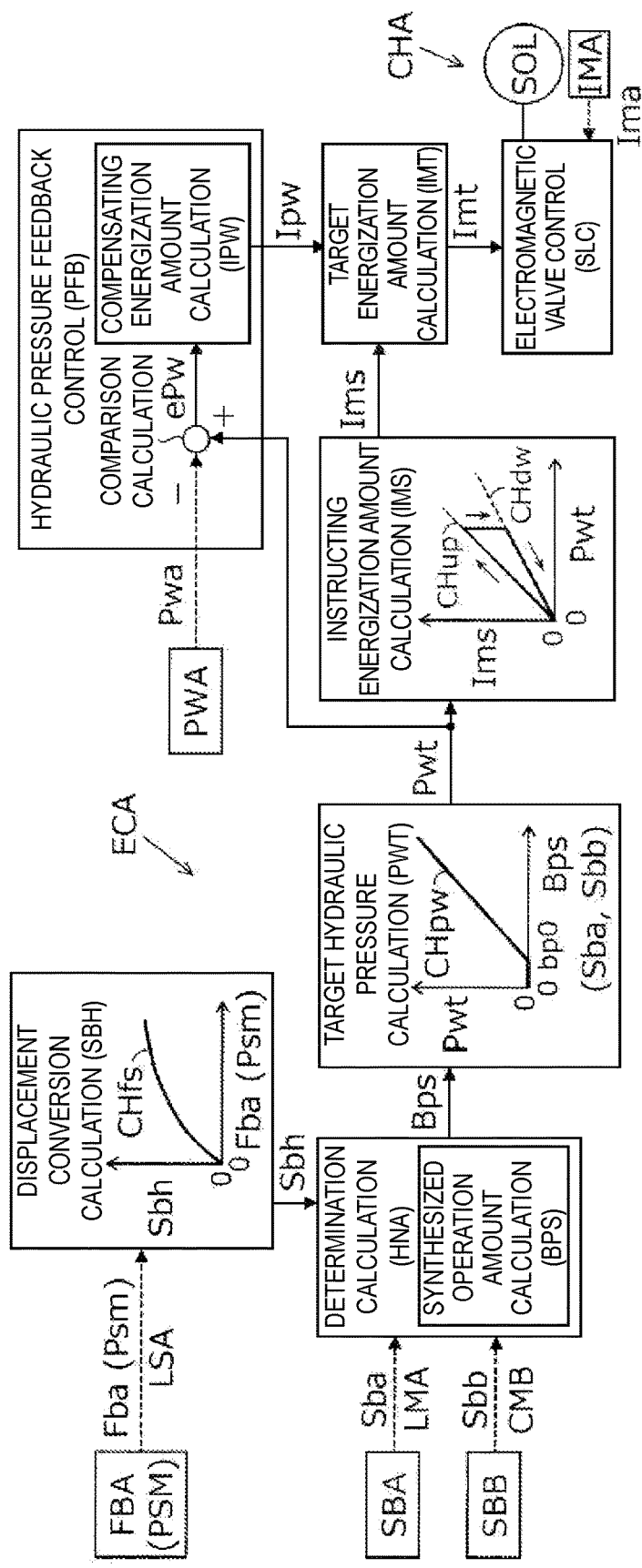
FIG. 2 is a function block diagram for explaining processes in a first controller.

As shown in FIG. 1, the vehicle includes two different hydraulic pressure units EAA, EAB. In addition to the first and second hydraulic pressure units EAA, EAB, the vehicle includes a braking operation member BP, an operational displacement sensor SBP, an operation force sensor FBP, a master cylinder MC, a stroke simulator SSM, a simulator shutoff valve VSM, a master cylinder shutoff valve VMC, fluid paths (brake pipings) HKA, HKB, HKW, and a notifying device HC. Furthermore, each wheel WH of the vehicle is provided with a brake caliper CP, a wheel cylinder WC, a rotating member KT, and a friction member.

The braking operation member (e.g., brake pedal) BP is a member operated by the driver to decelerate the vehicle. The braking torque of the wheel WH is adjusted, and the braking force is generated at the wheel WH by operating the braking operation member BP. Specifically, a rotating member (e.g., brake disc) KT is fixed to the wheel WH of the vehicle. The brake caliper CP is arranged so as to sandwich the rotating member KT. In the brake caliper (also simply referred to as caliper) CP, a wheel cylinder WC is provided. As the pressure of the brake fluid in the wheel cylinder WC is increased, the friction member (e.g., the brake pad) is pressed against the rotating member KT. Since the rotating member KT and the wheel WH are fixed so as to rotate integrally, a braking torque (braking force) is generated at the wheel WH by the frictional force generated at this time. As the caliper CP, a floating type caliper or an opposing type caliper can be adopted.

On the braking operation member BP, an operational displacement sensor SBP is provided so as to detect the operational displacement Sbp. A state variable related to "displacement" of the braking operation member BP is detected as the operational displacement Sbp. In other words, the operational displacement sensor SBP detects the "state quantity related to displacement" as the operational displacement Sbp. For example, in the braking operation member BP rotatably fixed to a vehicle body, a rotation angle of the braking operation member BP with respect to the vehicle body is detected as the operational displacement Sbp. In this case, the operational displacement sensor SBP is a rotation angle sensor. Furthermore, a displacement of a brake rod BRD mechanically connecting the braking operation member BP and a piston in the master cylinder MC with respect to the vehicle body can be detected as the operational displacement Sbp. In this case, the operational displacement sensor SBP is a linear displacement sensor.

The operational displacement sensor SBP is connected to the first hydraulic pressure unit EAA (in particular, first controller ECA) by way of a first displacement signal line LMA. Furthermore, the operational displacement sensor SBP is connected to the second hydraulic pressure unit EAB (in particular, second controller ECB) by way of a second displacement signal line LMB. Here, the first and second displacement signal lines LMA, LMB are cables (collective term of insulator, electric wire covered with protective coating, and optical fiber). In the first and second displacement signal lines LMA and LMB, only the operational displacement Sbp is transmitted, and other signals are not transmitted. When the operational displacement sensor SBP is incorporated in the first hydraulic pressure unit EAA, a pin (sensor pin) can be adopted as the first displacement signal line LMA.

The braking operation member BP is provided with an operation force sensor FBP so as to detect an operation force Fbp. A state variable related to "force" of the braking operation member BP is detected as the operation force Fbp. In other words, the operation force sensor FBP detects the "state quantity related to force" as the operation force Fbp. For example, in a case where the braking operation member BP is a brake pedal operated by foot, the pedaling force is detected as the operation force Fbp by a pedaling force sensor FBP. Furthermore, the hydraulic pressure Psm in a simulator SSM (i.e., in master cylinder MC) can be detected as the operation force Fbp. In this case, the operation force sensor FBP is a pressure sensor PSM.

The operation force sensor FBP is connected to the first hydraulic pressure unit EAA (in particular, first controller ECA) via a first force signal line LSA. Similarly, a cable (e.g., electric wire) is adopted as the first force signal line LSA. For example, the simulator hydraulic pressure sensor PSM, which is the operation force sensor FBP, can be incorporated in the first hydraulic pressure unit EAA. In this case, a pin (sensor pin) is adopted as the first force signal line LSA. In the first force signal line LSA as well, only the operation force Fbp (e.g., simulator hydraulic pressure Psm) is transmitted, and other signals are not transmitted.

A tandem master cylinder (also simply referred to as master cylinder) MC is connected to the braking operation member BP by way of a piston rod BRD. The operation force (e.g., brake pedal pedaling force) of the braking operation member BP is converted into the pressure of the brake fluid by the master cylinder MC. A fluid path (master cylinder piping) HKA is connected to the master cylinder MC, where when the braking operation member BP is operated, the brake fluid is discharged (pressure-fed) from the master cylinder MC to the fluid path HKA.

A stroke simulator (also simply referred to as a simulator) SSM is provided to cause the braking operation member BP to generate an operation force. A simulator shutoff valve VSM is provided between a hydraulic pressure chamber in the master cylinder MC and the simulator SSM. The simulator shutoff valve VSM is a two-position electromagnetic valve having an open position and a closed position. When the simulator shutoff valve VSM is at the open position, the master cylinder MC and the simulator SSM are in a communicating state, and when the simulator shutoff valve VSM is at the closed position, the master cylinder MC and the simulator SSM are in a shutoff state non-communicating state). A normally closed electromagnetic valve (NC valve) can be adopted as the simulator shutoff valve VSM.

A piston and an elastic body (e.g., a compression spring) are provided inside the simulator SSM. The brake fluid is moved from the master cylinder MC into the simulator SSM, and the piston is pushed by the flowing brake fluid. A force is imparted to the piston in a direction of inhibiting the inflow of the brake fluid by the elastic body. An operation force (e.g., brake pedal pedaling force) Fbp in the case where the braking operation member BP is operated is formed by the elastic body.

A simulator hydraulic pressure sensor PSM is provided so as to detect the simulator hydraulic pressure Psm as the operation force Fbp. Here, the simulator hydraulic pressure sensor PSM is one of the operation force sensors FBP. The simulator hydraulic pressure Psm is input to the first controller ECA of the first hydraulic pressure unit EAA via the first force signal line LSA (sensor pin).

A master cylinder shutoff valve VMC is provided in a fluid path (master cylinder piping) HKA that connects the master cylinder MC and the wheel cylinder WC. The master cylinder shutoff valve VMC is a two-position electromagnetic valve having an open position and a closed position. The master cylinder MC and the wheel cylinder WC are in a communicating state when the master cylinder shutoff valve VMC is at the open position, and the master cylinder MC and the wheel cylinder WC are in a shutoff state (non-communicating state) when the master cylinder shutoff valve VMC is at the closed position. A normally opened electromagnetic valve (NO valve) can be adopted as the master cylinder shutoff valve VMC.

<<First Hydraulic Pressure Unit EAA>>

The first hydraulic pressure unit EAA generates hydraulic pressure in the wheel cylinder WC provided in the four wheels WH of the vehicle in place of the master cylinder MC. When the first hydraulic pressure unit EAA is operated, the master cylinder shutoff valve VMC is at the closed position, and movement of the brake fluid from the master cylinder MC to the wheel cylinder WC is inhibited. In this case, the simulator shutoff valve VSM is at the open position, and thus the brake fluid from the master cylinder MC is moved to the simulator SSM. The first hydraulic pressure unit EAA is a braking control device having a so-called brake-by-wire configuration. The first hydraulic pressure unit EAA is configured by a first power source PUA, a first pressure regulating mechanism CHA, a first hydraulic pressure sensor PWA, and a first controller (electronic control unit) ECA.

In the first power source PUA, the pressure of the brake fluid is generated using power other than muscle strength of the driver as a power source. For example, the first power source PUA is a hydraulic pump driven by an electric motor. In this case, the hydraulic pressure generated by the hydraulic pump can be stored and used in the pressure accumulator. Furthermore, a fluid cylinder (electric cylinder) driven by the electric motor can be adopted as the first power source PUA. Specifically, the rotational power of the electric motor is converted into a linear power by a power conversion mechanism (e.g., a screw mechanism), whereby the piston in the electric cylinder is pressed, and pressure is generated in the brake fluid.

The hydraulic pressure generated by the first power source PUA is controlled to a desired hydraulic pressure by the first pressure regulating mechanism CHA. The first pressure regulating mechanism CHA is controlled by the first controller ECA. For example, the first pressure regulating mechanism CHA is configured by a linear electromagnetic valve SOL. Specifically, the high pressure stored in the pressure accumulator is regulated by the linear electromagnetic valve SOL and output from the first pressure regulating mechanism CHA. In the case where the electric cylinder is adopted as the first power source PUA, the first power source PUA functions as the first pressure regulating mechanism CHA. Specifically, hydraulic pressure control is performed by adjusting the output of the electric motor of the electric cylinder. Therefore, the electric cylinder operates as the first power source PUA and the first pressure regulating mechanism CHA. The first hydraulic pressure unit EAA (i.e., first pressure regulating mechanism CHA) is fluidly connected to the second hydraulic pressure unit EAB by way of a fluid path HKB.

The pressure regulation result Pwa of the first pressure regulating mechanism CHA is detected by the first hydraulic pressure sensor PWA. That is, the first hydraulic pressure sensor PWA detects the output hydraulic pressure Pwa of the first hydraulic pressure unit EAA (in particular, first pressure regulating mechanism CHA). The output hydraulic pressure Pwa is input to the first controller ECA as the actual braking hydraulic pressure Pwa.

The first power source PUA and the first pressure regulating mechanism CHA are controlled by the first controller (electronic control unit) ECA. In the first controller ECA, signals for controlling the electromagnetic valves VSM, VMC are calculated and output. The first controller ECA is configured by a control algorithm programmed in the microprocessor and an electric circuit (drive circuit) that drives the electric motor and the electromagnetic valve according to the algorithm. Furthermore, the first controller ECA is connected to the second controller ECB of the second hydraulic pressure unit EAB by way of a communication bus CMB (e.g., serial communication bus) in a state where signal transmission with the second controller ECB can be carried out. For example, controller area network (CAN) may be adopted as the communication bus CMB.

—Calculation Process by the First Controller ECA—

The calculation process by the first controller ECA and the like will be described with reference to the function block diagram of FIG. 2. The processing described below is a calculation algorithm, and is programmed in the microcomputer of the first controller ECA.

In the displacement conversion calculation block SBH of the first controller ECA, the operation force Fbp (e.g., simulator hydraulic pressure Psm) acquired via the first force signal line LSA is read as the first force processing value Fba. In the displacement conversion calculating block SBH, the displacement conversion value Sbh is calculated based on the first force processing value Fba and the conversion characteristic CHfs. The rigidity (e.g., spring constant of internal elastic body) of the simulator SSM is known. Therefore, the first force processing value Fba, which is a "state variable related to force", can be converted into "state variable related to displacement" based on the rigidity of the simulator SSM. Therefore, the first force processing value Fba is converted into the displacement conversion value Sbh based on the conversion characteristic (calculation map) CHfs. Here, the displacement characteristic CHfs is set in advance so that the displacement conversion value Sbh monotonically increases in an "upwardly convex" shape from "0" as the first force processing value Fba increases from "0". The rigidity of the simulator SSM is set so as to correspond to the rigidity (i.e., spring constant) of each fluid path HKA, HKB, HKW, the rigidity of the caliper CP, the rigidity of the friction member, and the like.

In the first determination processing block HNA, the operational displacement Sbp obtained via the first displacement signal line LMA is read as the first displacement processing value Sba. Furthermore, the second displacement processing value Sbb obtained via the communication bus CMB is read in the determination processing block HNA. Furthermore, the displacement conversion value Sbh is input to the determination processing block HNA from the displacement conversion calculation block SBH. In the determination processing block HNA, "whether or not the first displacement processing value Sba is suitable" is determined based on the first displacement processing value Sba, the second displacement processing value Sbb, and the displacement conversion value Sbh. In addition, the synthesized operation amount Bps is calculated based on the first and second displacement processing values Sba, Sbb and the displacement conversion value Sbh. Details of the suitability determination of the first displacement processing value Sba in the determination processing block HNA will be described later.

When the first displacement processing value Sba is suitable, the synthesized operation amount calculation block BPS in the first determination processing block HNA calculates the synthesized operation amount Bps based on the first displacement processing value Sba and the displacement conversion value Sbh. Specifically, the synthesized operation amount Bps is calculated by equation (1).

$$Bps = Ksb \times Sba + (1 - Ksb) \times Sbh \qquad \text{Equation (1)}$$

Here, the contribution coefficient Ksb is a coefficient of greater than or equal to "0" and smaller than or equal to "1", and decreases as the first displacement processing value Sba (or first force processing value Fba) increases. Therefore, when the first displacement processing value Sba is relatively small, the contribution degree of the first displacement processing value Sba in the synthesized operation amount Bps is made relatively large. The contribution degree of the first displacement processing value Sba decreases as the first displacement processing value Sba increases. When the first displacement processing value Sba becomes relatively large, the contribution degree of the first force processing value Fba in the synthesized operation amount Bps is made relatively large.

On the other hand, when the first displacement processing value Sba is unsuitable, the second displacement processing value Sbb is adopted instead of the first displacement processing value Sba, and the synthesized operation amount Bps is calculated based on the second displacement processing value Sbb and the displacement conversion value Sbh. Specifically, the synthesized operation amount Bps is calculated by equation (2) using the contribution coefficient Ksb.

$$Bps = Ksb \times Sbb + (1 - Ksb) \times Sbh \qquad \text{Equation (2)}$$

In the target hydraulic pressure calculating block PWT of the first controller ECA, the target hydraulic pressure Pwt is calculated based on the synthesized operation amount Bps and the calculation characteristic CHpw. The target hydraulic pressure Pwt is a target value of the output hydraulic pressure of the first hydraulic pressure unit EAA. Here, the calculation characteristic CHpw is a calculation map set in advance for determining the target hydraulic pressure Pwt.

In the calculation characteristic CHpw, the target hydraulic pressure Pwt is determined to be "0" when the synthesized operation amount Bps is greater than or equal to "0" and smaller than the predetermined value bpo, and target hydraulic pressure Pwt is calculated so as to monotonically increase with increase in the synthesized operation amount Bps when the synthesized operation amount Bps is greater than or equal to the predetermined value bpo. Here, the predetermined value bpo is a value equivalent to the play of the braking operation member BP.

The first controller ECA outputs a drive signal for setting the simulator shutoff valve VSM to the open position and outputs a drive signal for setting the master cylinder shutoff valve VMC to the closed position when the synthesized operation amount Bps becomes greater than or equal to the predetermined value bpo. The master cylinder MC is brought into communication with the simulator SSM, and the first hydraulic pressure unit EAA is brought into communication with the wheel cylinder WC by such signals.

The first power source PUA and the electric motor (for driving hydraulic pump or for electric cylinder) constituting the first pressure regulating mechanism CHA, and the linear electromagnetic valve SOL are controlled based on the hydraulic pressure target value Pwt calculated by the first controller ECA.

For example, in the case where the linear electromagnetic valve SOL is adopted as the first pressure regulating mechanism CHA, an instructing energization amount Ims of the linear electromagnetic valve SOL is determined based on the target hydraulic pressure Pwt by an instructing energization amount calculating block IMS. Furthermore, in a hydraulic pressure feedback control block PFB, the hydraulic pressure feedback control is executed based on the actual hydraulic pressure (detected value) Pwa. A hydraulic pressure deviation ePw between the target value Pwt of the braking hydraulic pressure and the detected value Pwa is calculated, and based on this deviation ePw, a compensating energization amount Ipw is calculated by a compensating energization amount calculating block IPW.

In the target energization amount calculating block IMT, the target energization amount Imt is determined by the instructing energization amount Ims and the compensating energization amount Ipw. In the target energization amount calculating block IMT, the instructing energization amount Ims is finely adjusted by the compensating energization amount Ipw so that the actual value Pwa of the wheel cylinder hydraulic pressure Pwc coincides with the target value Pwt by the PID control based on the hydraulic pressure deviation ePw. In the electromagnetic valve control block SLC, the linear electromagnetic valve SOL is controlled based on the target energization amount Imt. The drive circuit of the linear electromagnetic valve SOL is provided with an energization amount sensor IMA, and an actual energization amount Ima (e.g., a current value) is detected. Then, the current feedback control is executed so that the actual energization amount Ima coincides with the target energization amount Imt. Highly accurate hydraulic pressure control by the linear electromagnetic valve SOL can be executed by the hydraulic pressure feedback control and the current feedback control. The first hydraulic pressure unit EAA has been described above.

<<Second Hydraulic Pressure Unit EAB>>

Returning to the overall configuration diagram of FIG. 1, the second hydraulic pressure unit EAB will be described. In the vehicle, the second hydraulic pressure unit EAB is provided separately from the first hydraulic pressure unit EAA. That is, two hydraulic pressure units EAA, EAB are provided in the vehicle. The second hydraulic pressure unit EAB is provided in a fluid path between the first hydraulic pressure unit EAA and the wheel cylinder WC. A fluid path HKB between the first hydraulic pressure unit EAA and the second hydraulic pressure unit EAB is a pressure regulating piping, and a fluid path HKW between the second hydraulic pressure unit EAB and the wheel cylinder WC is a wheel cylinder piping. That is, the first hydraulic pressure unit EAA and the second hydraulic pressure unit EAB are arranged in series with respect to the wheel cylinder WC.

The second hydraulic pressure unit EAB adjusts the hydraulic pressure Pwc of the wheel cylinder WC of each wheel WH independently of the driver's braking operation based on the turning state of the vehicle. Accordingly, the hydraulic pressure (i.e., output hydraulic pressure Pwa) generated by the first hydraulic pressure unit EAA is adjusted by the second hydraulic pressure unit EAB, and the final wheel cylinder hydraulic pressure Pwc is generated. The second hydraulic pressure unit EAB is a so-called hydraulic pressure unit for electronic stability control (ESC).

Similar to the first hydraulic pressure unit EAA, the second hydraulic pressure unit EAB is configured by a second power source PUB, a second pressure regulating mechanism CHB, a second hydraulic pressure sensor PWB, and a second controller (electronic control unit) ECB. The pressure of the brake fluid is generated by the second power source PUB that is separate from the first power source PUA. For example, the second power source PUB is a hydraulic pump driven by an electric motor.

The hydraulic pressure generated by the second power source PUB is controlled to a desired hydraulic pressure by the second pressure regulating mechanism CHB. The second power source PUB, and the second pressure regulating mechanism CHB are controlled by the second controller ECB. For example, the second pressure regulating mechanism CHB is configured by a linear electromagnetic valve. The hydraulic pressure is increased by the hydraulic pump driven by the electric motor, and the hydraulic pressure is adjusted by a differential pressure valve (electromagnetic valve). Furthermore, the hydraulic pressure Pwc in the wheel cylinder WC of each wheel WH is independently adjusted by a combination of a pressure increasing electromagnetic valve and a pressure reducing electromagnetic valve.

Similar to the first controller ECA, the second controller ECB of the second hydraulic pressure unit EAB includes a control algorithm programmed in the microprocessor, an electric circuit (drive circuit) for driving the electric motor and the electromagnetic valve according to the algorithm.

The second controller ECB receives a yaw rate Yra from a yaw rate sensor YRA, a lateral acceleration Gya from a lateral acceleration sensor GYA, a steering angle Swa from an operation angle sensor SWA, and a wheel speed Vwa from a wheel speed sensor VWA. To execute vehicle stability control (control to suppress excessive understeer and oversteer based on yaw rate Yra etc.), anti-skid control (control to suppress wheel lock based on wheel speed Vwa etc.), and the like based on the signals (Yra, Vwa, etc.), the target value Pwt of the braking hydraulic pressure (hydraulic pressure in wheel cylinder WC) is calculated in each wheel WH. Then, the wheel cylinder hydraulic pressure Pwc is adjusted so that the target value Pwt is achieved.

In the second hydraulic pressure unit EAB, in addition to executing the vehicle stability control and the like, the hydraulic pressure adjustment of the wheel cylinder WC can be executed according to the operational displacement Sbp (i.e., second displacement processing value Sbb) of the braking operation member BP when the first hydraulic pressure unit EAA is in a malfunction state. The second hydraulic pressure unit EAB is provided with the second power source PUB and the second pressure regulating mechanism CHB different from the first hydraulic pressure unit EAA.

The operational displacement Sbp is input to the second controller ECB via the second displacement signal line LMB and is read as the second displacement processing value Sbb. In addition, the second displacement processing value Sbb is transmitted from the second controller ECB to the first controller ECA via the communication bus CMB (e.g., serial communication bus). In the case where the first hydraulic pressure unit EAA is malfunctioning, the second hydraulic pressure unit EAB increases the hydraulic pressure Pwc of the wheel cylinder WC in place of the first hydraulic pressure unit EAA based on the second displacement processing value Sbb. At this time, the operation of the first hydraulic pressure unit EAA is stopped.

Similar to the first determination processing block HNA of the first controller ECA, the second determination processing block HNB can be formed in the second controller ECB. The suitability of the second displacement processing value Sbb is determined through a similar method. The second hydraulic pressure unit EAB has been described above.

From the second hydraulic pressure unit EAB (in particular, first pressure regulating mechanism CHA), the discharge and inflow of the brake fluid regulated with each wheel cylinder WC are carried out through the fluid path (wheel cylinder piping) HKW. The piston in the wheel cylinder WC moves (forward or backward) with respect to the rotating member KT, and the braking force of the wheel WH is adjusted (increased, or decreased) by adjusting the hydraulic pressure Pwc in the wheel cylinder WC of the caliper CP.

The vehicle is provided with a notifying device HC. When the first displacement processing value Sba or the like is in an unsuitable state, this is notified to the driver by the notifying device HC. For example, the notifying device HC notifies the driver of the unsuitable state by sound, light, or the like.

In the target hydraulic pressure calculation block PWT, the displacement conversion value Sbh is not adopted, and the target hydraulic pressure Pwt can be calculated based on the first displacement processing value Sba or the second displacement processing value Sbb. More specifically, when the first displacement processing value Sba is suitable, the target hydraulic pressure Pwt is determined based on the first displacement processing value Sba and the calculation characteristic CHpw. In other words, "Ksb=1" is substituted to the equation (1) in the synthesized operation amount calculation block BPS, and "Bps=Sba" is calculated. On the other hand, when the first displacement processing value Sba is not suitable, the target hydraulic pressure Pwt is determined based on the second displacement processing value Sbb and the calculation characteristic CHpw. That is, "Ksb=1" is substituted to the equation (2) in the synthesized operation amount calculation block BPS and "Bps=Sbb" is calculated.

<Processing by First and Second Controllers ECA, ECB>

Figure 3:
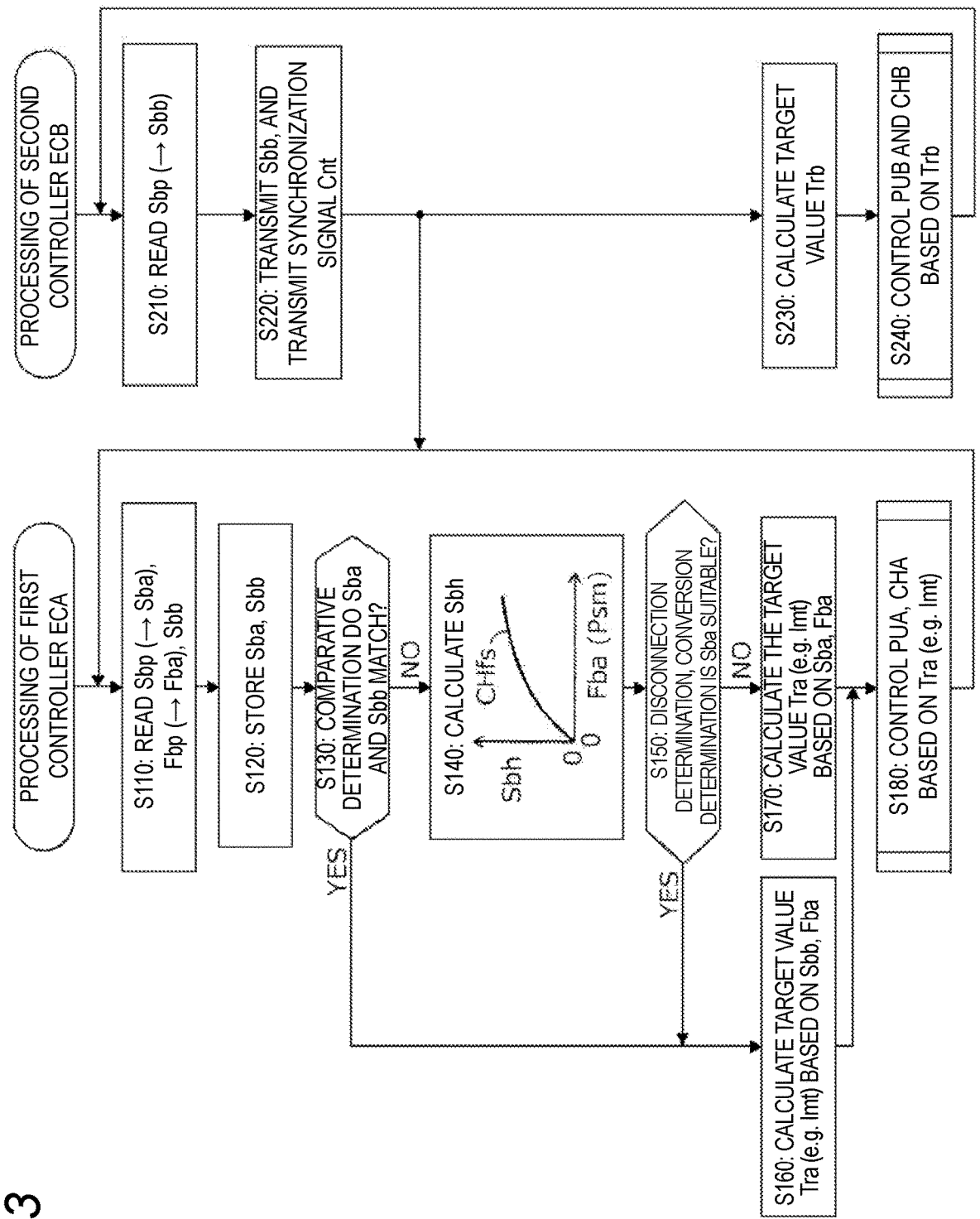
FIG. 3 is a flowchart for explaining processes in the first and second controllers.

The processing in the first and second controllers ECA and ECB will be described with reference to a flowchart of FIG. 3.

First, the processing in the first controller ECA will be described. In step S110, the operational displacement Sbp is read as the first displacement processing value Sba, and the operation force Fbp is read as the first force processing value Fba. When the sensors SBP and SFK are analog type sensors, analog to digital conversion is performed, and the first displacement processing value Sba and the first force processing value Fba are read. Furthermore, the second displacement processing value Sbb is acquired and read via the communication bus CMB.

In step S120, the first and second displacement processing values Sba, Sbb are stored. Then, in step S130, "whether or not the first displacement processing value Sba and the second displacement processing value Sbb coincide" is determined. Here, the determination process by comparison between the first displacement processing value Sba and the second displacement processing value Sbb in step S130 is referred to as "comparative determination". When "Sba≈Sbb (substantially coincide)" and the result in step S130 is affirmative ("YES"), the process proceeds to step S160. The suitable states of the first and second displacement processing values Sba, Sbb are determined by "Sba≈Sbb". On the other hand, when "Sba≠Sbb" and the result in step S130 is negative ("NO"), the process proceeds to step S140. Either one of the first displacement processing value Sba or the second displacement processing value Sbb is determined as unsuitable by "Sba≠Sbb".

In step S140, the first force processing value Fba is converted based on the displacement characteristic CHfs, and the displacement conversion value Sbh is calculated. The displacement characteristic CHfs is set in advance based on the rigidity (spring constant of compression spring, etc.) of the simulator SSM. In the displacement characteristic CHfs, the displacement conversion value Sbh is determined with the characteristic of being "convex upward" with respect to the increase of the first force processing value Fba.

In step S150, "whether or not the first displacement processing value Sba is suitable" is determined. For example, the suitability of the first displacement processing value Sba can be determined based on the displacement conversion value Sbh. The suitability determination is referred to as "conversion determination". Specifically, the first and second displacement processing values Sba, Sbb are compared with the displacement conversion value Sbh. Then, among the first displacement processing value Sba and the second displacement processing value Sbb, a value closer to the displacement conversion value Sbh is determined as suitable, and a value deviated from the displacement conversion value Sbh is determined as unsuitable.

In the conversion determination, the deviation eSb between the first displacement processing value Sba and the displacement conversion value Sbh is calculated, and the suitability of the first displacement processing value Sba can be determined based on the displacement deviation eSb. Specifically, when the displacement deviation eSb is smaller than a predetermined value esz, the first displacement processing value Sba is determined as suitable. On the other hand, when the displacement deviation eSb is greater than or equal to the predetermined value esz, the first displacement processing value Sba is determined as unsuitable. Here, the predetermined value esz is a threshold value for determination set in advance.

In step S150, in addition to the conversion determination based on the displacement conversion value Sbh, "whether or not the first displacement signal line LMA is disconnected ("disconnection determination")" is executed. When the first displacement signal line LMA is disconnected, the first displacement processing value Sba is read as "a value that is impossible in reality". Therefore, in the disconnection determination, the suitability of the first displacement processing value Sba is determined based on the value of the first displacement processing value Sba itself.

When the result in step S150 (disconnection determination and conversion determination) is affirmed ("YES"), the process proceeds to step S160. When the result in step S150 is negative ("NO"), the process proceeds to step S170.

In step S160, the first target value Tra is calculated based on the first displacement processing value Sba and the first force processing value Fba. Here, the first target value Tra is a target value for controlling the first power source PUA and the first pressure regulating mechanism CHA. The case where the process of step S160 is executed is a case where the first displacement processing value Sba is suitable. Therefore, in the calculation process (see FIG. 2) in the synthesized operation amount calculation block BPS, the first displacement processing value Sba and the first force processing value Fba are adopted and the final target value Imt (one example of first target value Tra) is determined.

In step S170, the first target value Tra is calculated based on the second displacement processing value Sbb and the first force processing value Fba. The case where the process of step S170 is executed is a case where "the first displacement processing value Sba is not suitable but the second displacement processing value Sbb is suitable". Therefore, in the calculation process in the synthesized operation amount calculation block BPS, the second displacement processing value Sbb and the first force processing value Fba are adopted and the final target value Imt (one example of first target value Tra) is determined.

In the calculations of step S160 and step S170, the first force processing value Fba is not adopted, and the first target value Tra can be calculated on the basis of the first displacement processing value Sba or the second displacement processing value Sbb. In this case, in the calculation process in the synthesized operation amount calculation block BPS, the synthesized operation amount Bps is determined so as to coincide with the first displacement processing value Sba or the second displacement processing value Sbb.

In step S180, the first power source PUA and the first pressure regulating mechanism CHA of the first hydraulic pressure unit EAA are driven and controlled based on the first target value Tra calculated in step S160 and step S170. Thereafter, the process returns to step S110.

Next, the processing in the second controller ECB will be described. In step S210, the operational displacement Sbp is read as the second displacement processing value Sbb via the second displacement signal line LMB. When the operational displacement sensor SBP is an analog type sensor, the analog to digital conversion is performed, and the first displacement processing value Sba is read, similar to the processing in the ECA.

In step S210, the second displacement processing value Sbb is transmitted from the second controller ECB to the first controller ECA via the communication bus CMB. At this time, the synchronization signal Cnt is transmitted at the same time. Here, the synchronization signal Cnt is a signal for compensating the phase difference of the calculation cycle between the first controller ECA and the second controller ECB and synchronizing the calculation cycle of each other. Although the synchronization signal Cnt is transmitted from the second controller ECB to the first controller ECA, it may be transmitted from the first controller ECA to the second controller ECB.

In step S230, the second target value Trb is calculated based on the second displacement processing value Sbb. Here, the second target value Trb is a target value for controlling the second power source PUB and the second pressure regulating mechanism CHB of the second hydraulic pressure unit EAB. In step S240, the second power source PUB and the second pressure regulating mechanism CHB of the second hydraulic pressure unit EAB are driven and controlled based on the second target value Trb.

When the first displacement processing value Sba is appropriate, the braking hydraulic pressure Pwc is adjusted by the first hydraulic pressure unit EAA based on the first displacement processing value Sba. When determined that the first displacement processing value Sba is unsuitable, the operation of the first hydraulic pressure unit EAA is not stopped. After determined that the first displacement processing value Sba is unsuitable, the first hydraulic pressure unit EAA stops adopting the first displacement processing value Sba, and adjusts the braking hydraulic pressure Pwc based on the second displacement processing value Sbb obtained via the communication bus CMB instead of the first displacement processing value Sba. Therefore, when the first displacement processing value Sba malfunctions, the increase in the braking hydraulic pressure Pwc is not carried out by switching to the second hydraulic pressure unit EAB but is continued by the first hydraulic pressure unit EAA. In this way, a redundant system is formed, and the reliability of the operation of the device can be secured with a simple configuration. The outline of the processing in the first and second controllers ECA and ECB has been described above.

<<Suitability Determination Processing of First Displacement Processing Value Sba>>

Next, details of the suitability determination of the first displacement processing value Sba will be described.

—Comparative Determination—

When the first displacement processing value Sba and the second displacement processing value Sbb substantially coincide in the comparative determination (process of step S130), both the first displacement processing value Sba and the second displacement processing value Sbb are determined as being suitable.

On the other hand, when the first displacement processing value Sba and the second displacement processing value Sbb do not coincide, the probability that either one of the first displacement processing value Sba or the second displacement processing value Sbb is suitable, and the other is unsuitable is high. In this case, the first displacement processing value Sba has a possibility of being unsuitable.

—Conversion Determination—

In the conversion determination (process of step S150), when the first displacement processing value Sba and the second displacement processing value Sbb do not coincide, one of the two state quantities closer to the displacement conversion value Sbh is determined as suitable. That is, when the first displacement processing value Sba is more approximate to the displacement conversion value Sbh, the first displacement processing value Sba is determined as suitable. On the other hand, when the second displacement processing value Sbb is more approximate to the displacement conversion value Sbh, the first displacement processing value Sba is determined as unsuitable.

Here, the displacement conversion value Sbh is calculated based on the first force processing value Fba and the conversion characteristic. Although the first displacement processing value Sba and the first force processing value Fba are different physical quantities, a known relationship exists between these physical quantities. Specifically, the first displacement processing value Sba is a physical quantity corresponding to "displacement", and the first force processing value Fba is a physical quantity corresponding to "force". Therefore, the first force processing value Fba is reread as the displacement conversion value Sbh based on the conversion characteristic (conversion map by a spring constant of the entire device) CHfs set in advance.

The conversion determination may be executed based on a comparison between the first displacement processing value Sba and the displacement conversion value Sbh. More specifically, a deviation (displacement deviation) eSb between the first displacement processing value Sba and the displacement conversion value Sbh is calculated and "whether or not the displacement deviation eSb is smaller than the threshold value esz" is determined. The first displacement processing value Sba is determined as suitable in the case of "eSb<esz", and the first displacement processing value Sba is determined as unsuitable in the case of "eSb≥esz". Here, the threshold value esz is a predetermined value set in advance. This is because a mutual relationship exists between the physical quantity of the first displacement processing value Sba and the physical quantity of the first force processing value Fba.

—Disconnection Determination—

In step S150, the disconnection determination of the first displacement signal line LMA can be performed. In a state where the first displacement signal line LMA is disconnected, the first displacement processing value Sba becomes an unrealistic value. Therefore, the first displacement processing value Sba is determined to be unsuitable based on the value of the first displacement processing value Sba. Similarly, the disconnection of the first force signal line LSA is determined based on the value itself of the first force processing value Fba. The first force processing value Fba can be determined as unsuitable by the disconnection determination of the first force signal line LSA. Furthermore, the disconnection determination is performed in step S210. In other words, the suitability of the second displacement processing value Sbb is determined by the disconnection determination of the second displacement signal line LMB based on the value of the second displacement processing value Sbb (determination of "whether the value of the second displacement processing value Sbb is realistic").

Note that in the suitability determination, the comparative determination of step S130 can be omitted. Even in this case, the suitability of the first displacement processing value Sba can be determined by the disconnection determination and the conversion determination of step S150.

The redundancy of the device operation can be secured with a simplified device configuration by the comparative determination in which the signals Sba, Sbb from the operational displacement sensor SBP are mutually monitored by the first and second controllers ECA, ECB. Furthermore, the reliability of the signal (read value) Sba of the operational displacement Sbp can be improved by the "conversion determination based on the first force processing value Fba" and the "disconnection determination of the first and second displacement signal lines LMA and LMB based on the values of the first and second displacement processing values Sba and Sbb". The sensor signals are mutually monitored by one operational displacement sensor SBP without forming a redundant configuration including two operational displacement sensors, and the reliability of the device can be secured. As described above, the suitability determination process of the first displacement processing value Sba has been described.

<<Phase Difference Compensation of Calculation Cycle>>

The phase difference compensation of the calculation cycle in the first and second controllers ECA and ECB will be described.

The first controller ECA and the second controller ECB are in communication via the communication bus CMB. The communication bus CMB is a serial communication bus, and data is serially transmitted one bit at a time in one communication path. For example, controller area network (CAN) is adopted as the communication bus CMB.

A phase difference may occur in the calculation cycle due to calculation delay and communication delay between the two controllers ECA and ECB. For example, when the time delay of the signal transmission by the communication bus CMB is large, the second displacement processing value Sbb is read with a lag in time with respect to the first displacement processing value Sba in the processing at the first controller ECA. Therefore, when the second displacement value Sbb is adopted for the comparative determination and the calculation of the first target value Tra, the time delay needs to be compensated.

The time delay of the signal transmission through the communication bus CMB is can be predicted in advance. Therefore, the present second displacement value Sbb and the first displacement value Sba of at least one calculation cycle prior are compared, and the suitability of the first displacement processing value Sba can be determined. For example, the present reception value Sbb(n) of the second displacement processing value is compared with the previous (one calculation cycle prior) read value Sba (n−1) of the first displacement processing value. Here, the inside of the parentheses represents the calculation cycle, "n" represents the present cycle, and "n−1" represents the previous cycle. First and second displacement processing values Sba, Sbb of different calculation cycles, to which signal transmission delay is taken into consideration, are compared. As a result, the time delay of the signal transmission can be compensated.

Furthermore, in step S120, the first and second displacement processing values Sba, Sbb are stored, a comparison based on the stored first displacement processing value Sba (first storage value Sbak) and the stored second displacement processing value Sbb (second storage value Sbbk) is performed, and the suitability of the first displacement processing value Sba can be determined. Here, the first and second displacement processing values Sba, Sbb are stored over at least one or more calculation cycles. For example, as the first and second storage values Sbak, Sbbk, an average value in the storage period can be adopted. Since the first and second storage values Sbak, Sbbk stored over a plurality of calculation periods are compared, the influence of the time delay of signal transmission can be alleviated.

<Phase Difference Compensation of Calculation Cycle by Synchronization Signal Cnt>

Figure 4:
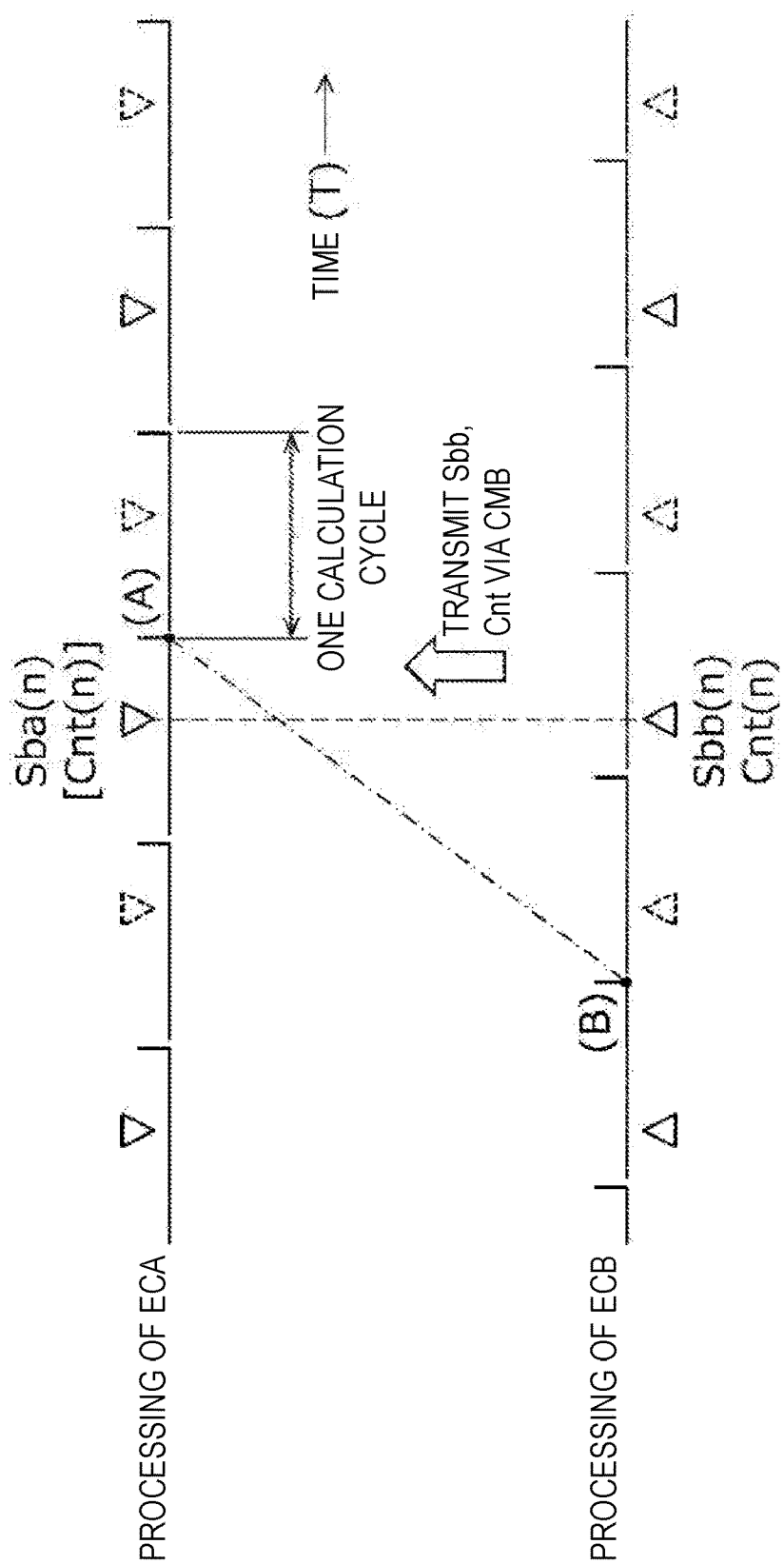
FIG. 4 is a time-series diagram for explaining phase difference compensation of a calculation cycle by a synchronization signal.

The phase difference compensation of the calculation cycle based on the synchronization signal Cnt will be described with reference to the time series diagram of FIG. 4. FIG. 4 shows the calculation cycle in the first and second controllers ECA, ECB at the lapse of time T. Time points (A) and (B) are reading at the same timing, and the calculation cycle in the first controller ECA and the calculation cycle in the second controller ECB are not synchronized (that is, phases do not coincide) due to calculation delay and communication delay. Specifically, from the viewpoint of the first controller ECA, that processed by the first controller ECA is temporally advanced, and that processed by the second controller ECB is temporally behind. When the time delay becomes large, a shift worth a plurality of calculation cycles occurs. Therefore, when the first displacement processing value Sba and the second displacement processing value Sbb are compared at a timing determined within one calculation cycle, signals read at different timings may be compared.

The second controller ECB simultaneously transmits the synchronization signal Cnt to the first controller ECA with the transmission of the second displacement processing value Sbb via the communication bus CMB. The first controller ECA immediately reads the first displacement processing value Sba at the timing of receiving the synchronization signal Cnt and compares the first displacement processing value Sba with the second displacement processing value Sbb. The first displacement processing value Sba and the second displacement processing value Sbb are synchronized by the synchronization signal Cnt and the first displacement processing value Sba and the second displacement processing value Sbb of the same timing are compared.

The synchronization signal Cnt can be transmitted from the first controller ECA to the second controller ECB. In this case, the second controller ECB immediately transmits the second displacement processing value Sbb at the timing of receiving the synchronization signal Cnt. In the first controller ECA, the reception value Sbb is compared with the first displacement processing value Sba at the time point the synchronization signal Cnt is transmitted. Similar to the above, the time delay of signal transmission is avoided, and the first displacement processing value Sba and the second displacement processing value Sbb of the same timing are compared.

The transmission of the synchronization signal Cnt is performed every calculation cycle for comparative determination. Furthermore, the synchronization signal Cnt may be transmitted every plurality of calculation cycles. For example, the synchronization signal Cnt is transmitted once in two calculation cycles or once in three calculation cycles, and the first displacement processing value Sba and the second displacement processing value Sbb are synchronized and compared.

After the first displacement processing value Sba is determined as unsuitable, the second displacement processing value Sbb is required in the calculation of step S170, and hence the second displacement processing value Sbb and the synchronization signal Cnt are transmitted in pairs at every one calculation cycle. In other words, the synchronization signal Cnt is transmitted at every one or more calculation cycles for comparative determination. After the first displacement processing value Sba is determined as unsuitable, the synchronization signal Cnt is transmitted every calculation cycle in order to calculate the first target value Tra.

Since the time lag between the two controllers ECA and ECB is compensated by the synchronization signal Cnt, the appropriate suitability determination of the first displacement processing value Sba can be carried out. Furthermore, as the delay is compensated by the synchronization signal Cnt when the first displacement processing value Sba is determined as an unsuitable state and the first displacement processing value Sba is not adopted but the second displacement processing value Sbb is adopted for the calculation of the first target value Tra, the control based on the second displacement processing value Sbb can be carried out equally to the control based on the first displacement processing value Sba. Therefore, in the control of the first hydraulic pressure unit EAA, a redundant system is formed with a simple configuration, and the reliability of operation can be secured.

Similarly to the above, in the second controller ECB as well, "disconnection determination of the second displacement signal line LMB", "comparative determination by the second displacement processing value Sbb and the first displacement processing value Sba (acquired via the communication bus CMB)", and "conversion determination by the second displacement processing value Sbb and the displacement conversion value Sbh (acquired via the communication bus CMB)" are respectively executed, and the suitability of the second displacement processing value Sbb is determined. The phase difference compensation of the first and second displacement processing values Sba, Sbb has been described above.

Second Embodiment of Braking Control Device for Vehicle

Figure 5:
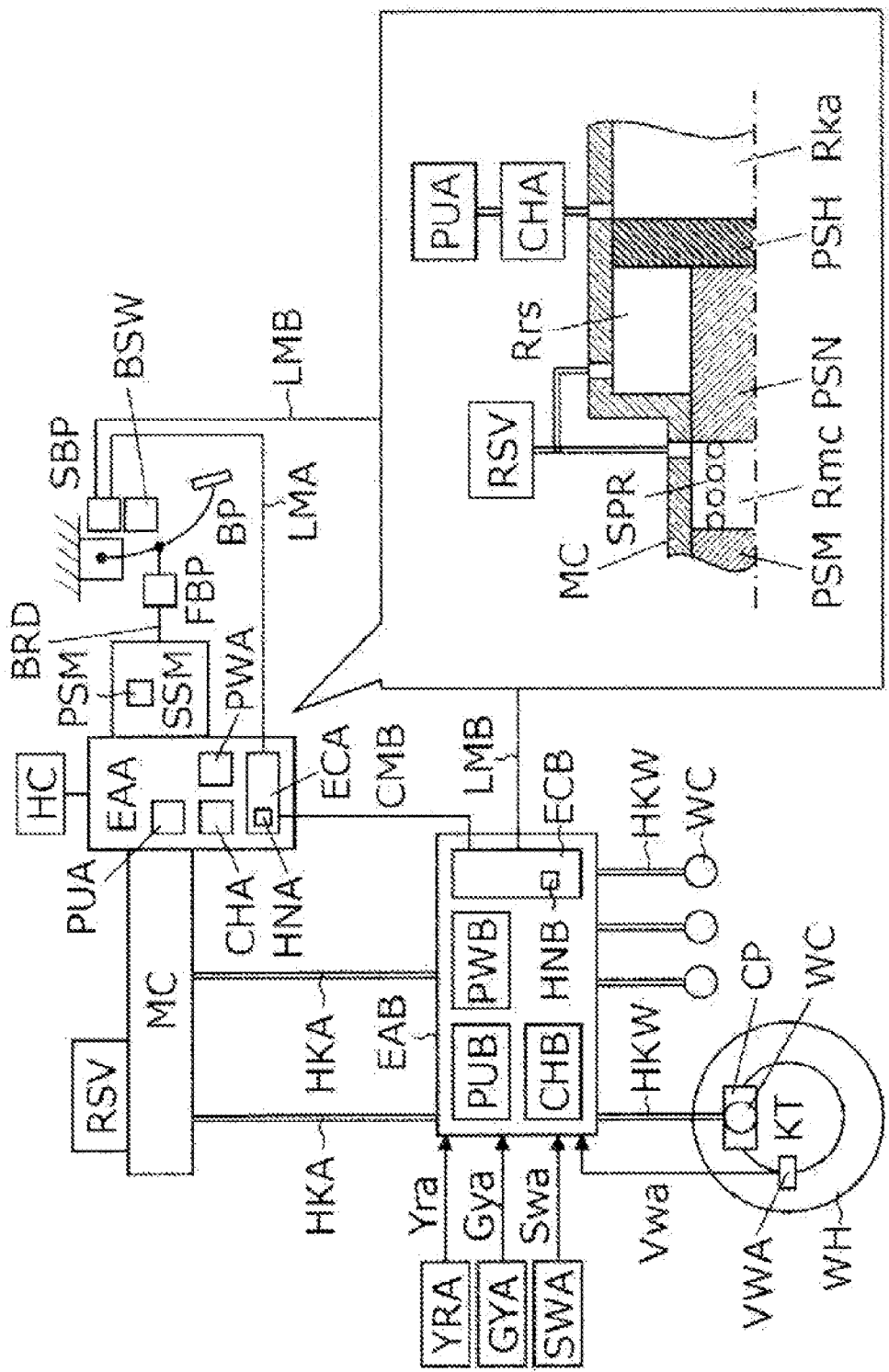
FIG. 5 is an overall configuration view for explaining a second embodiment of a braking control device for a vehicle according to the present invention.

A second embodiment of the braking control device for the vehicle according to the present invention will be described with reference to an overall configuration diagram of FIG. 5. In the first embodiment, the wheel cylinder WC is selectively pressurized (so-called brake-by-wire configuration) by one of the first hydraulic pressure unit EAA and the master cylinder MC. In the second embodiment, the first hydraulic pressure unit EAA is provided between the master cylinder MC and the braking operation member BP, and the pressurization of the wheel cylinder WC is always performed through the master cylinder MC. As described above, since members having the same symbols, calculation processing, signals, characteristics, values, and the like are the same, the difference from the first embodiment will be mainly described.

The first hydraulic pressure unit EAA is provided between the master cylinder MC and the braking operation member BP. As shown in the cross-sectional view of the balloon portion, the master cylinder MC is of a tandem type, and two master cylinder chambers Rmc partitioned by first and second master pistons PSN, PSM and the inner wall of the master cylinder MC are formed. A compression spring SPR is provided between the first master piston PSN and the second master piston PSM. The master cylinder chamber Rmc is fluidly connected to the second hydraulic pressure unit EAB through the fluid path HKA. When the first and second master pistons PSN and PSM are moved in the forward direction (to the left in the figure), the volume of the master cylinder chamber Rmc is reduced and the brake fluid is pressure fed from the master cylinder MC toward the wheel cylinder WC. The hydraulic pressure Pwc of the wheel cylinder WC thereby rises. Conversely, when the master pistons PSN, PSM are moved in the backward direction (to the right in the figure), the volume of the master cylinder chamber Rmc is increased and the brake fluid is absorbed from the wheel cylinder WC to the master cylinder MC. The hydraulic pressure Pwc of the wheel cylinder WC thereby decreases.

The first hydraulic pressure unit EAA is provided with a pressurizing piston PSH so as to press the first master piston PSN in the master cylinder MC. A pressurizing chamber Rka is formed by the inner wall of the first hydraulic pressure unit EAA and the pressurizing piston PSH. Furthermore, a reservoir chamber Rrs is formed by the inner wall of the first hydraulic pressure unit EAA, the master piston PSN, and the pressurizing piston PSH. The reservoir chamber Rrs is connected to the reservoir RSV and the internal pressure is set at atmospheric pressure. The first pressure regulating mechanism CHA is fluidly connected to the pressurizing chamber Rka. The hydraulic pressure generated by the first power source PUA is regulated by the first pressure regulating mechanism CHA and supplied to the pressurizing chamber Rka.

When the hydraulic pressure in the pressurizing chamber Rka is increased, the pressurizing piston PSH presses the master piston PSN in the forward direction. As a result, the first and second master pistons PSN and PSM are moved in the forward direction, and the hydraulic pressure Pwc of the wheel cylinder WC is increased. On the other hand, when the hydraulic pressure in the pressurizing chamber Rka is decreased, the force for pressing the master piston PSN in the forward direction by the pressurizing piston PSH is decreased. As a result, the first and second master pistons PSN and PSM are moved in the backward direction by the return spring SPR or the like, and the hydraulic pressure Pwc of the wheel cylinder WC is decreased.

Similar to the first embodiment, the simulator SSM may be provided. In this case, the braking control device is of a brake-by-wire type, and the operation force Fbp of the braking operation member BP is generated by the simulator SSM.

Furthermore, a configuration in which the simulator SSM is omitted may be adopted. In the configuration without the simulator SSM, the operation force Fbp of the braking operation member BP is generated through the master cylinder MC. Here, the first hydraulic pressure unit EAA functions as a booster device (brake booster). In this case, the conversion characteristic CHfs is set based on the rigidity (i.e., spring constant) of each fluid path HKA, HKW, the rigidity of the caliper CP, the rigidity of the friction member, and the like.

In the second embodiment as well, at least one of comparison determination, comparative determination, and disconnection determination is executed, and the suitability of the first displacement processing value Sba is determined, similar to the first embodiment. Then, when the first displacement processing value Sba is determined as unsuitable, the first displacement processing value Sba is not adopted for control, the first target value Tra (e.g., target energization amount Imt) is calculated based on the second displacement processing value Sbb, and the braking hydraulic pressure Pwc is controlled based on the first target value Tra. That is, when the first displacement processing value Sba is unsuitable, the braking hydraulic pressure Pwc is adjusted based on the second displacement processing value Sbb obtained from the communication bus CMB instead of the first displacement processing value Sba. In the second embodiment as well, the same effect (simplification of the device configuration and securing of reliability) as in the first embodiment is obtained.

The invention claimed is:
1. A braking control device for a vehicle that adjusts a braking hydraulic pressure of a wheel cylinder according to an operation of a braking operation member of a vehicle to a generate a braking force at a wheel, braking control device comprising:
 an operational displacement sensor that detects an operational displacement of the braking operation member;
 an operation force sensor that detects an operation force of the braking operation member;
 a first hydraulic pressure unit that reads the operational displacement as a first displacement processing value via a first displacement signal line and adjusts the braking hydraulic pressure based on the first displacement processing value;

a second hydraulic pressure unit that reads the operational displacement as a second displacement processing value via a second displacement signal line and adjusts the braking hydraulic pressure based on the second displacement processing value; and communication bus for transmitting a signal between the first hydraulic pressure unit and the second hydraulic pressure unit; wherein the first hydraulic pressure unit acquires the second displacement processing value from the second hydraulic pressure unit via the communication bus, calculates a displacement conversion value, which is a state variable related to displacement, based on the operation force, executes, on the basis of a comparison between the first displacement processing value and the displacement conversion value, a suitability determination of whether or not the first displacement processing value is suitable, adjusts the braking hydraulic pressure based on the first displacement processing value when the first displacement processing value is suitable, and adjusts the braking hydraulic pressure based on the second displacement processing value in place of the first displacement processing value when the first displacement processing value is unsuitable.

2. The braking control device for the vehicle according to claim 1, wherein the first hydraulic pressure unit executes the suitability determination based on a disconnection determination of whether or not the first displacement signal line is disconnected.

3. The braking control device for the vehicle according to claim 2, wherein one of the first hydraulic pressure unit and the second hydraulic pressure unit transmits a synchronization signal at every calculation cycle when the first displacement processing value is unsuitable; and the first hydraulic pressure unit acquires the second displacement processing value based on the synchronization signal.

4. The braking control device for the vehicle according to claim 1, wherein one of the first hydraulic pressure unit and the second hydraulic pressure unit transmits a synchronization signal at every calculation cycle when the first displacement processing value is unsuitable; and the first hydraulic pressure unit acquires the second displacement processing value based on the synchronization signal.

* * * * *